United States Patent [19]

Liu

[11] Patent Number: 5,197,753
[45] Date of Patent: Mar. 30, 1993

[54] FOLDING BABY BUGGY FRAME ASSEMBLY

[76] Inventor: Kun-Hei Liu, 2 F., No. 32, Lane 200, Tung Hwa Street, Taipei, Taiwan

[21] Appl. No.: 890,124

[22] Filed: May 29, 1992

[51] Int. Cl.$^5$ ............................................. B62B 7/08
[52] U.S. Cl. ................................... 280/642; 280/644; 280/647; 280/650; 280/658
[58] Field of Search ............... 280/642, 644, 647, 649, 280/650, 658, 657, 47.38

[56] References Cited

U.S. PATENT DOCUMENTS

| | | | |
|---|---|---|---|
| 4,062,555 | 12/1977 | Peng et al. | 280/647 |
| 4,265,466 | 5/1981 | Kassai | 280/47.38 |
| 5,112,069 | 5/1992 | Aldus et al. | 280/657 |
| 5,121,940 | 6/1992 | March | 280/47.38 |

*Primary Examiner*—Eric D. Culbreth
*Attorney, Agent, or Firm*—Varndell Legal Group

[57] ABSTRACT

A folding baby buggy frame assembly which has two handlebars respectively made from a plastic material, each having a projecting rod directly molded thereon to support a canopy frame and an extension rod adjustably locked in place by a lock switch. The extension rods are made from a plastic material with an inner projection and a rear wheel frame holder directly molded thereon for respectively connecting a seat frame and a rear wheel frame. The two seat frames are respectively connected to the handlebars by use of the inner projections to hold a seat with an adjustment sheet directly molded on the seat frames for adjustably connecting the seat frames to the extension rods. The two rear wheel frames each have a rear wheel holder directly molded thereon to hold a rear wheel assembly. Two front wheel frames made from a plastic material are respectively secured on the ends of the extension rods and each have a link and front wheel holder directly molded thereon to a hold a front wheel assembly.

5 Claims, 5 Drawing Sheets

FOLDING BABY BUGGY FRAME ASSEMBLY

BACKGROUND AND SUMMARY OF THE INVENTION

The present invention relates to a baby buggy, and more particularly the present invention relates to a folding baby buggy frame assembly of which the major parts are respectively made from a plastic material through the process of injection molding.

A variety of baby buggies are known and widely in use for pushing babies around in. FIG. 1 illustrates a folding baby buggy according to the prior art, which is generally comprised two symmetrical handlebars, two seat frames respectively connected to the symmetrical handlebars to hold a seat, two back frames pivoted at the center and connected between the two symmetrical handlebars to hold a canopy by a canopy frame, two front wheel frames connected to the handlebars to hold two front wheel assemblies, two rear wheel frames connected to the handlebars to hold two rear wheel assemblies, two bottom frames pivoted at the center and connected between the front and rear wheel frames at the bottom, and a foot plate. The handlebars are each comprised of a hooked handhold having an elongated extension rod connected thereto at the bottom. An L-shaped connecting plate, a projecting and a rear wheel frame holder are respectively fastened to each elongated extension rod for connecting either seat frame and either rear wheel frame. The two seat frames are each fastened with an adjustment sheet, which is connected to the extension rod of either handlebar by an adjustment sheet and a screw and nut set. Each front wheel frame is attached with a connecting plate at the bottom, to which a front wheel holder is connected and secured by a link and a connecting element to hold a front wheel assembly by a front wheel axle. Each rear wheel frame is attached with a rear wheel holder to hold a rear wheel assembly by a rear wheel axle. Each back frame has two opposite ends respectively fastened to either handlebar by connecting plates and fasteneing elements. Each bottom frame has one end pivoted to either rear wheel frame by a connecting plate pivoted to either front wheel frame. This structure of folding baby buggy frame assembly is complicated to manufacture and difficult to assemble because it is consisted of many parts. Because many parts and accessories are used, inventory control of the parts and accessories becomes difficult. Since the major parts accessories are made from iron, they must be treated through a variety of processing procedures including bending, cutting, finishing, paint coating, ect. These complicated manufacturing procedures greatly increase the manufacturing cost of a folding baby buggy. Because many plastic connecting elements are used to connect several metal parts together, these plastic connecting elements may become loosened or disconnected from place easily, more particularly after a long use. Furthermore, this structure of folding baby buggy is not safe in use because much parts and accessories are made from iron which may hurt the children easily.

The present invention has been accomplished to eliminate the aforesaid disadvantages. It is therefore an object of the present invention to provide a folding baby buggy folding frame assembly which is inexpensive to manufacture and easy to assemble. It is another object of the present invention to provide a folding baby buggy frame assembly which is and durable in use. It is still another object of the present invention to provide a folding baby buggy frame assembly which is safe in use. It is still another object of the present invention to provide a folding baby buggy frame assembly which needs less labor in its production. It is still another object of the present invention to provide a folding baby buggy frame assembly which greatly reduces the number of connecting elements. It is still another object of the present invention to provide a folding baby buggy which can be made in a uniform color to give a sense of beauty. It is still another object of the present invention to provide a folding baby buggy which can be manufactured in a manner to greatly reduce the number of defective products.

According to the preferred embodiment, a folding baby buggy comprises two handlebars respectively made from a plastic material through the process of injection molding and having each a projecting rod directly molded thereon to support a canopy frame and comprising each an extension rod adjustably locked in place by a lock switch, which extension rod being made from a plastic material through the process of injection molding with an inner projection and a rear wheel frame holder directly molded thereon for connecting either seat frame and either rear wheel frame; two seat frames respectively connected to the handlebars to hold a seat, of which each being made from a plastic material through the process of injection molding with an adjustment sheet thereof directly molded thereon for adjustably connecting to either extension rod; two rear wheel frames respectively made from a plastic material through the process of injection molding, of which each having a rear wheel holder directly molded thereon to hold a rear wheel assembly; and two front wheel frames respectively made from a plastic material through the process of injection molding of which each having a link and front wheel holder directly molded thereon to hold a front wheel assembly. The plastic material which is to be used in making the major parts of the folding baby buggy frame assembly through the process of injection molding, can be nylon, polypropylene or any of a variety of high impact plastics.

DETAILED DESCRIPTION OF THE PREFERRED EMBODIMENT

Figure 1:
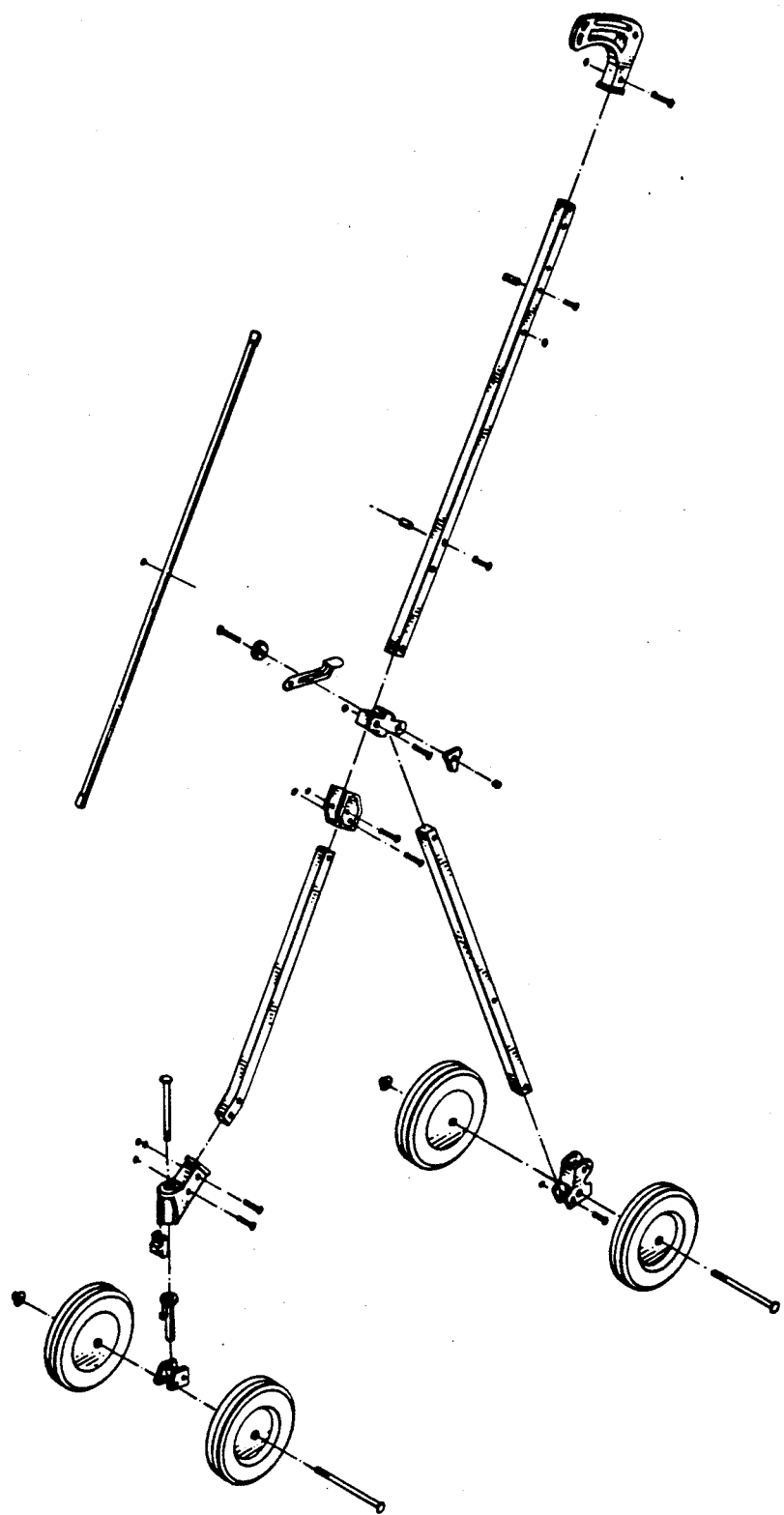
FIG. 1 is an exploded view of a prior art folding baby buggy frame assembly.
Figure 2:
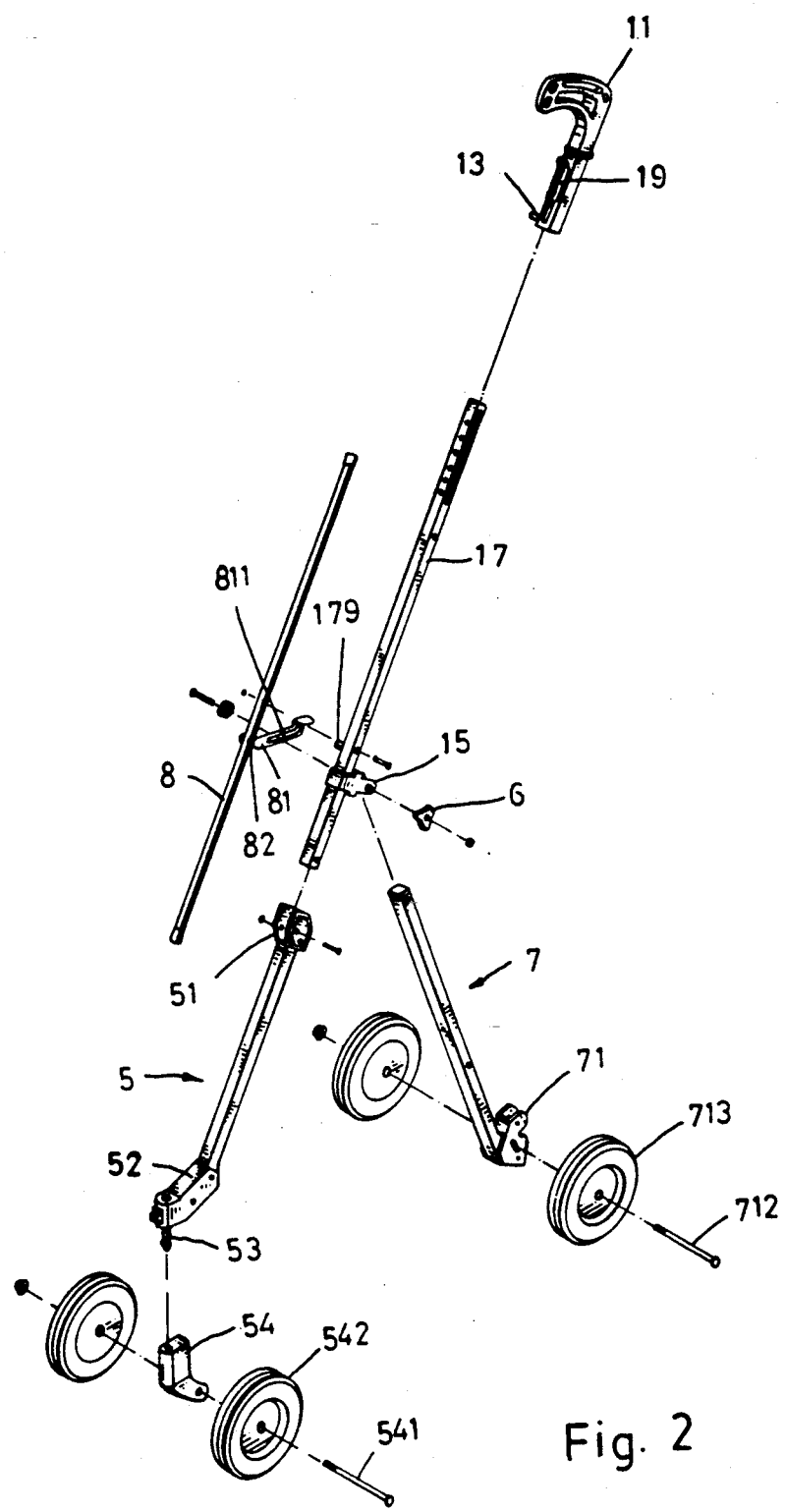
FIG. 2 is an exploded view of the preferred embodiment of the folding baby buggy frame assembly of the present invention.
Figure 3:
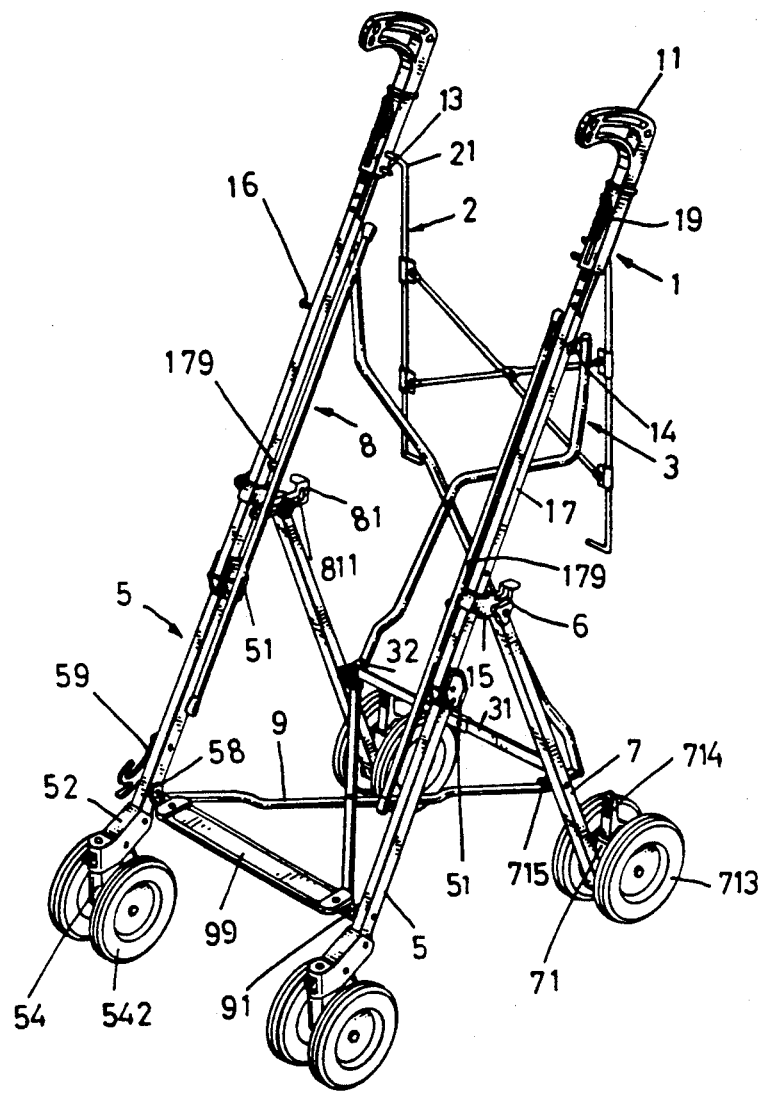
FIG. 3 is an elevational view of the preferred embodiment of the folding baby buggy frame assembly of the present invention.

Referring to FIGS. 2, 3, 4A, 4B, 5A and 5B, the folding baby buggy frame assembly comprises two symmetrical handlebars 1 for moving with the hands. Each handlebar 1 is comprised of a hooked handhold 11 at the top, an elongated extension rod 17 at the bottom, and a lock switch 19 controlled to lock the elongated extension rod 17 to the hooked handhold 11. By means of the control of the lock switch 19, the elongated extension rod 17 can be extended from the hooked handhold 11 within a fixed distance (see FIGS. 5A and 5B). The hooked handhold 11 comprises a hole (not shown) for fastening a folding canopy frame 2 and a projecting rod 13 to support either of the two rear angle rods 21 of the folding canopy frame 2. The elongated extension rod 17 comprises a connecting tab 14 for connecting a back frame 3, an inner projection 179 for connecting a seat frame 8, a rear wheel frame holder 15 to hold a rear wheel frame 7 by an adjusting screw 6, a bottom end (not indicated) connected to the handlebar holder 51 of a front wheel frame 5, a locating block 16 at an outer side to hold the positioning plate 59 of the corresponding front wheel frame 5 when folded up. The two seat frames 8 which are respectively pivoted to the inner projection 179 of either extension rod 17, comprise each an outer projection 82 and an adjustment sheet 81. The adjustment sheet 81 comprises an elongated slot 811, into which the adjusting screw 6 is threaded. The front wheel frames 5 which are respectively connected to the two extension rods 17 are supported on two front wheel assemblies 542. Each front wheel frame 5 comprises a handlebar holder 51 at the top to hold either extension rod 17, an L-shaped connecting plate 58 to hold a bottom frame 9, a front wheel holder 54 connected to a bottom end 52 thereof by a link 53 to hold a front wheel assembly 542 by a front wheel axle 541. One of the two front wheel frames 5 comprises a positioning plate 59, which is retained in place by the locating block 16 when folded up. The two curved back frames 3 which connect the two extension rods 17 together are pivoted at the center. Each back frame 3 has one end pivoted to the connecting tab 14 of either extension rod 17, and an opposite end formed into a L-shaped connecting plate 32 connected to each other by an folding connection 31. The L-shaped connecting plate 32 of each back frame 3 has an opposite end connected to either rear wheel frame 7. The two rear wheel frames 7 which are respectively connected to the two extension rods 17 are supported on two rear wheel assemblies 713. Each rear wheel frame 7 has a top end connected to the rear wheel frame holder 15 on either extension rod 17 by an adjusting screw 6, and a bottom end connected to a rear wheel holder 71 to hold a rear wheel assembly 713 by a rear wheel axle 712. Each rear wheel frame 7 also comprises a L-shaped connecting plate 715 to hold a bottom frame 9, and a rear brake 714 controlled to stop the rear wheel assembly 713. The two bottom frames 9 which are connected between the front wheel frames 5 and the rear wheel frames 7 are pivoted at the center, of which each has one end pivoted to the L-shaped connecting plate 715 of either rear wheel frame 7 and an opposite end formed into a L-shaped connecting plate 91 pivoted to the L-shaped connecting plate 58 of either front wheel frame 9. There is also provided a foot plate 99 made of a resilient material having two opposite ends respectively connected to the L-shaped connecting plate 91 of either bottom frame 9.

Figure 4:
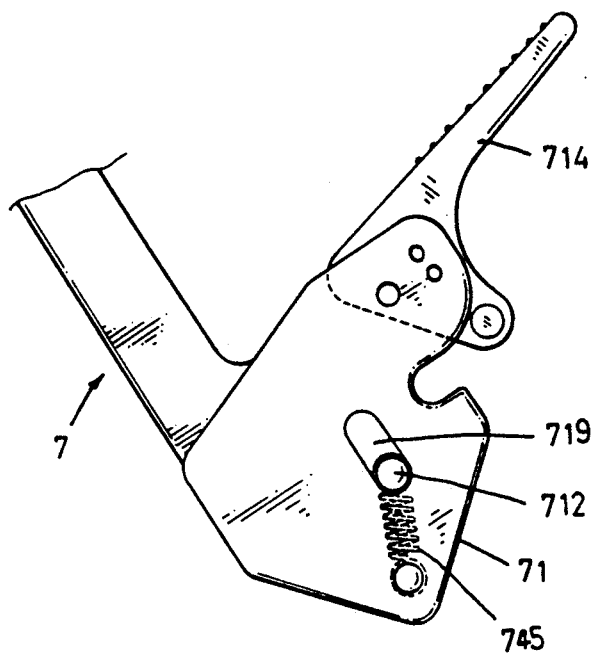
FIG. 4A is a cross section of the front wheel holder of the preferred embodiment of the folding baby buggy frame assembly of the present invention.
FIG. 4B is a side view of the rear wheel frame of the preferred embodiment of the folding baby buggy frame assembly of the present invention showing that the rear wheel axle is connected thereto by springs.
Figure 4:
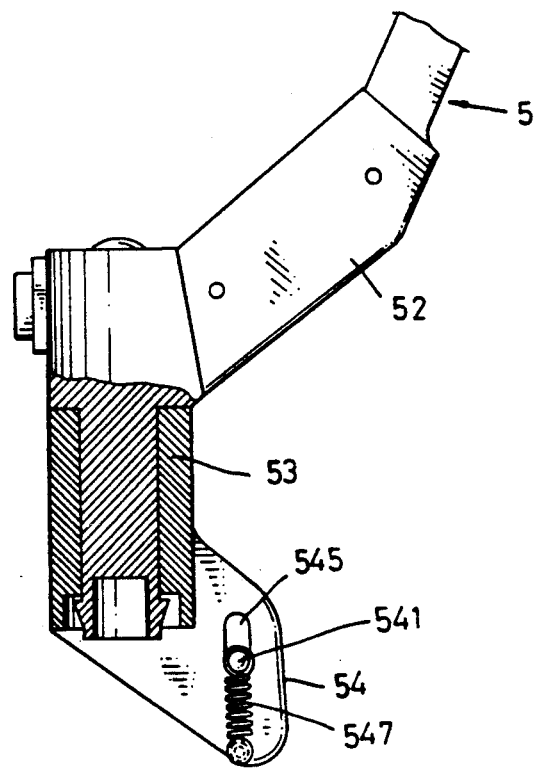
Figure 5A:
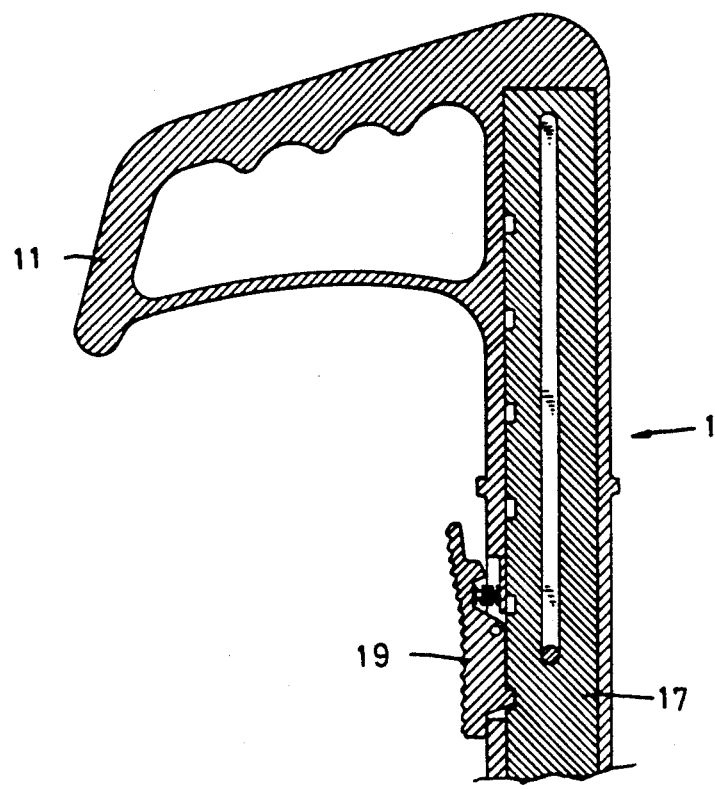
FIG. 5A is a partly sectional view of the adjustable handlebar according to the present invention, showing that the extension rod has been locked in the hooked handhold.
Figure 5B:
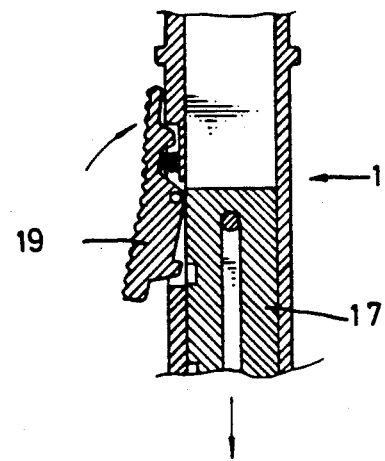
FIG. 5B is another partly sectional view of the adjustable handlebar according to the present invention, showing that unlocking the lock switch causes the extension rod to be extended from the hooked handhold.

The frame assembly of the aforesaid embodiment is characterized in that the hooked handhold 11 of each handlebar 1 is made of a plastic material through the process of injection molding with the projecting rod 13 thereof directly molded thereon; the extension rod 17 of each handlebar 1 is made from a plastic material through the process of injection molding with the locating block 16, the inner projection 179 and the rear wheel frame holder 15 thereof directly molded thereon; each seat frame 8 is made from a plastic material through the process of injection molding with the outer projection 82 and the adjustment sheet 81 thereof directly molded thereon; each rear wheel frame 7 is made from a plastic material through the process of injection molding with the rear wheel holder 71 thereof directly molded thereon; each front wheel frame 5 is made from a plastic material through the process of injection molding with the link 53 and the front wheel holder 54 directly molded thereon; each front wheel axle 541 is inserted through an oval hole 545 on the front wheel holder 54 of each front wheel frame 5 and retained in place by a spring 547 for absorbing shock waves transmitted by the front axle (see FIG. 4A); each rear wheel axle 712 is inserted through an oval hole 719 on the rear wheel holder 71 of either rear wheel frame 7 and secured in place by a spring 745 for absorbing shock waves transmitted by the rear axle (see FIG. 4B).

Further, the major parts of the baby buggy frame assembly including the handlebars 1, the seat frames 8, the front wheel frames 5 and the rear wheel frames 7 are respectively made from a plastic material, which can be nylon, polypropylene or any of a variety of high impact plastics, through the process of injection molding.

I claim:
1. A folding baby buggy frame assembly comprising:
two symmetrical handlebars, said handlebars each comprised of a hooked handhold and an extension rod extensibly connected to said hooked handhold by a lock switch, said hooked handholds respectively comprising a hole for fastening a folding canopy frame and a projecting rod to support said folding canopy frame; said extension rods respectively comprising a connecting tab for connecting a back frame, an inner projection for connecting a seat frame, a rear wheel frame holder for holding a rear frame by an adjusting screw, and a bottom connected to a handlebar holder of a front wheel frame; one of said extension rods having a locating block at an outer side thereof;
two seat frames respectively connected to said inner projection of each extension rod to hold a seat, said seat frames each comprising an outer projection and an adjustment sheet, said adjustment sheet comprising an elongated slot connected to said rear wheel holder of either extension rod by said adjusting screw;
two front wheel frames respectively connected to said handlebars and supported on two front wheel assemblies; said front wheel frames each comprising said handlebar holder at a top thereof to hold either extension rod, an L-shaped connecting plate to hold a bottom frame, a front wheel holder connected to a bottom end thereof by a link to hold a front wheel assembly by a front wheel axle; said two front wheel frames including one having a positioning plate retained in place by said locating block of said one extension rod after said folding baby buggy frame assembly has been folded up;

two curved back frames pivoted together at respective centers thereof and respectively connected to said handlebars, said curved back frames each having one end pivoted to said connecting tab of said extension rod of either handlebar and an opposite end formed into a L-shaped connecting plate connected to each other by a folding connection, said L-shaped connecting plate of each back frame having an opposite end connected to a rear wheel frame;

two rear wheel frames respectively connected to said handlebars and respectively supported on two rear wheel assemblies; said rear wheel frames each having a top end connected to said rear wheel holder of said extension rod of either handlebar by said adjusting screw, and a bottom end connected to a rear wheel holder to hold a rear wheel assembly by a rear wheel axle; said rear wheel frames each comprising an L-shaped connecting plate to hold a bottom frame and a rear brake controlled to stop said rear wheel assembly;

two bottom frames pivoted together at respective centers thereof and respectively connected between said front wheel frames and said rear wheel frames, said bottom frames each having one end pivoted to said L-shaped connecting plate of either rear wheel frame and an opposite end formed into a L-shaped connecting plate pivoted to said L-shaped connecting plate of either front wheel frame; and a foot plate made of a resilient material having two opposite ends respectively connected to said L-shaped connecting plate of either bottom frame;

wherein said hooked handhold of each handlebar is made of a plastic material with said projecting rod thereof directly molded thereon; said extension rod of each handlebar is made from a plastic material with said inner projection and said rear wheel frame holder thereof directly molded thereon, said one of said extension rods having said locating block molded thereon; each seat frame is made from a plastic material with said outer projection and said adjustment sheet thereof directly molded thereon; each rear wheel frame is made from a plastic material with said rear wheel holder thereof directly molded thereon; each front wheel frame is made from a plastic material with said link and said front wheel holder directly molded thereon.

2. The reversible folding baby buggy frame assembly according to claim 1, wherein each front wheel axle is inserted through an oval hole on said front wheel holder of each front wheel frame and retained in place by a spring for absorbing shock waves transmitted by said front wheel axle.

3. The folding baby buggy frame assembly according to claim 1, wherein each rear wheel axle is inserted through an oval hole on said rear wheel folder of either rear wheel frame and secured in place by a spring for absorbing shock waves transmitted by said rear wheel axle.

4. The folding baby buggy frame assembly according to claim 1, wherein said handlebars, said seat frames, said front wheel frames and said rear wheel frames are respectively made from a one of nylon and polypropylene.

5. The folding baby buggy frame assembly according to claim 1, wherein said handlebars said seat frames, said front wheel frames and said rear wheel frames are respectively made from a high impact plastic.

* * * * *